UNITED STATES PATENT OFFICE.

HEINRICH AUGUST BERNTHSEN, OF MANNHEIM, AND PAUL JULIUS, OF LUDWIGSHAFEN, ASSIGNORS TO THE BADISCHE ANILIN AND SODA-FABRIK, OF LUDWIGSHAFEN, GERMANY.

RED DYE AND PROCESS OF MAKING SAME.

SPECIFICATION forming part of Letters Patent No. 555,359, dated February 25, 1896.

Application filed December 6, 1895. Serial No. 571,308. (Specimens.) Patented in England February 6, 1893, No. 2,614, and in France February 13, 1893, No. 227,892.

*To all whom it may concern:*

Be it known that we, HEINRICH AUGUST BERNTHSEN, a subject of the King of Prussia, Emperor of Germany, residing at Mannheim, in the Grand Duchy of Baden, and PAUL JULIUS, a subject of the Emperor of Austria-Hungary, residing at Ludwigshafen-on-Rhine, in the Kingdom of Bavaria, Empire of Germany, have invented new and useful Improvements in the Manufacture of a New Substantive Red Dye, (for which patents have been obtained in England, No. 2,614, dated February 6, 1893, and in France, No. 227,892, dated February 13, 1893,) of which the following is a specification.

Our invention relates to the manufacture of a new red dye which fixes itself on cotton goods and the like from a boiling neutral or alkaline bath without the aid of a mordant.

Our new dye is chemically a mixed disazo dye derived from tetrazo-diphenyl, salicylic acid, and 2. 4'. 2' amido-naphthol-sulfo acid, (see Patents Nos. 521,095 and 521,096,) and in the form of free acid possesses the following formula:

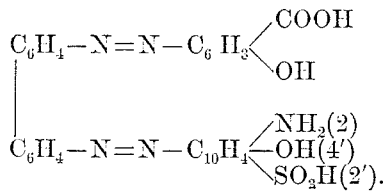

The following example will serve to illustrate the manner in which our invention can best be carried into practical effect and our new dye obtained. The parts are by weight.

Example: Prepare the tetrazo-diphenyl solution in the usual way from about thirteen (13) parts of benzidin hydrochlorid, seven hundred and fifty (750) parts of water, seventeen (17) parts of hydrochloric acid (containing about thirty per cent. (30%) real acid H Cl) and seven (7) parts of sodium nitrite in ten per cent. (10%) solution. Pour the tetrazo solution into a mixture of about seven (7) parts of salicylic acid, about forty (40) parts of calcined soda, and about two hundred and fifty (250) parts of water. When the production of the intermediate product thus formed is complete add a solution of about twelve (12) parts of the amido-naphthol-sulfo acid and about thirty (30) parts of calcined soda in about two hundred and fifty (250) parts of water. After some time boil the mixture and precipitate the dye with common salt.

Our new dye is a brownish powder. It is soluble in both hot and cold water, giving red solutions, hardly soluble in alcohol, practically insoluble in benzene ether and ligroine, soluble in sulfuric acid, giving a violet-blue solution. On gradual dilution this assumes a more violet color, and finally deposits a brown precipitate. It is especially characterized by its behavior on treatment with nitrous acid, yielding readily a dark gray to black diazo compound, which combines with, for instance, beta-naphthol yielding dark shades. This test readily distinguishes the dye from other red substantive colors. It can best be effected on the fiber. Thus if a small piece of cotton be dyed with our new dye and be treated with dilute nitrous acid it will assume the gray to black color of the diazo compound, and then if it be immersed in an alkaline solution of beta-naphthol the dark shade of the trisazo dye formed will show itself.

What we claim as new, and desire to secure by Letters Patent, is—

1. As a new article of manufacture the red substantive disazo dye which can be derived from benzidine, salicylic acid, and 2. 4'. 2' amido-naphthol-sulfo acid which is readily soluble in hot and cold water giving red solutions, soluble in sulfuric acid giving a violet-blue solution, and which on treatment with nitrous acid yields a gray to black diazo compound capable of uniting with beta-naphthol to yield a dark shade of color, all substantially as described.

2. The process for the manufacture of a new red substantive disazo body by converting a benzidin salt (one molecule) into the tetrazo compound by treatment with nitrous acid then combining this with salicylic acid (one molecule) and subsequently with 2. 4'. 2' amido-naphthol-sulfo acid (one molecule) in alkaline solution, boiling and precipitating with common salt, all substantially as hereinbefore described.

In testimony whereof we have hereunto set our hands in the presence of two subscribing witnesses.

HEINRICH AUGUST BERNTHSEN.
PAUL JULIUS.

Witnesses:
ERNEST F. EHRHARDT,
ADOLPH REUTLINGER.